US009005070B2

(12) United States Patent
Hoffmann et al.

(10) Patent No.: US 9,005,070 B2
(45) Date of Patent: Apr. 14, 2015

(54) CLUTCH ARRANGEMENT FOR A VEHICLE DRIVE TRAIN

(71) Applicant: GETRAG Getriebe- und Zahnradfabrik Hermann Hagenmeyer GmbH & Cie KG, Untergruppenbach (DE)

(72) Inventors: Werner Hoffmann, Siegburg (DE); Bernd Oberhausen, Cologne (DE)

(73) Assignee: GETRAG Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 2 days.

(21) Appl. No.: 13/683,615

(22) Filed: Nov. 21, 2012

(65) Prior Publication Data
US 2013/0130861 A1    May 23, 2013

(30) Foreign Application Priority Data
Nov. 23, 2011    (DE) .......................... 10 2011 119 573

(51) Int. Cl.
| F16H 1/32 | (2006.01) |
| F16H 48/22 | (2006.01) |
| F16D 25/08 | (2006.01) |
| F16D 21/00 | (2006.01) |
| F16D 25/0638 | (2006.01) |
| F16D 25/06 | (2006.01) |

(52) U.S. Cl.
CPC ................ F16H 48/22 (2013.01); F16D 25/08 (2013.01); F16D 21/00 (2013.01); F16D 25/0638 (2013.01); F16D 25/06 (2013.01)

(58) Field of Classification Search
USPC ............ 192/110 R, 48.611, 48.609, 3.63, 35; 475/269, 220, 223, 243, 248, 253, 252
See application file for complete search history.

(56) References Cited

U.S. PATENT DOCUMENTS

| 5,879,260 | A  | * | 3/1999 | Yoshida et al. .............. 475/214 |
| 5,893,016 | A  | * | 4/1999 | Landa et al. ................. 399/297 |
| 6,007,448 | A  | * | 12/1999 | Hotta et al. ................... 475/159 |
| 6,374,976 | B1 |  | 4/2002 | Alberni et al. |
| 2006/0281599 | A1 | * | 12/2006 | Murakami et al. ............ 475/249 |
| 2007/0111842 | A1 | * | 5/2007 | Suzuki et al. ................. 475/249 |
| 2008/0214355 | A1 |  | 9/2008 | Capito et al. |
| 2011/0136613 | A1 | * | 6/2011 | Lauwers ....................... 475/269 |

FOREIGN PATENT DOCUMENTS

| EP | 0 718 517 | 6/1996 |
| WO | WO 2009/145616 | 12/2009 |

OTHER PUBLICATIONS

European Search Report in related Application No. 12193590.2, dated Dec. 23, 2014 in 7 pages.

* cited by examiner

*Primary Examiner* — Saul Rodriguez
*Assistant Examiner* — David J Hlavka
(74) *Attorney, Agent, or Firm* — Knobbe Martens Olson & Bear, LLP

(57) ABSTRACT

A clutch arrangement has a rotary element which is mounted on a housing so as to be rotatable about a longitudinal axis and which defines a cavity. A clutch has a first clutch element and a second clutch element which can be coupled thereto, which clutch is arranged in the cavity. The first clutch element or the second clutch element is coupled to the rotary element. A fluidic actuator arrangement has a first and a second actuator element which can move relative to one another in order to activate the clutch. At least the first actuator element can be secured in a rotationally fixed fashion to the housing and extends from outside the rotary element into the cavity.

9 Claims, 3 Drawing Sheets

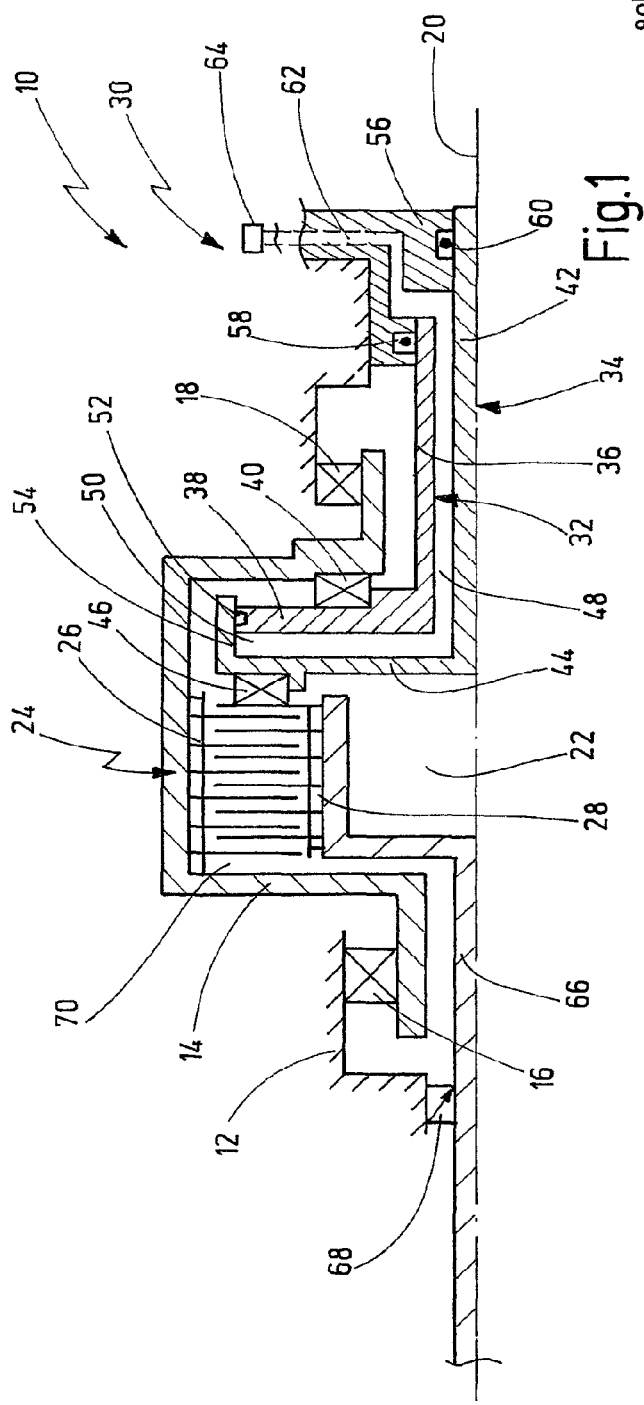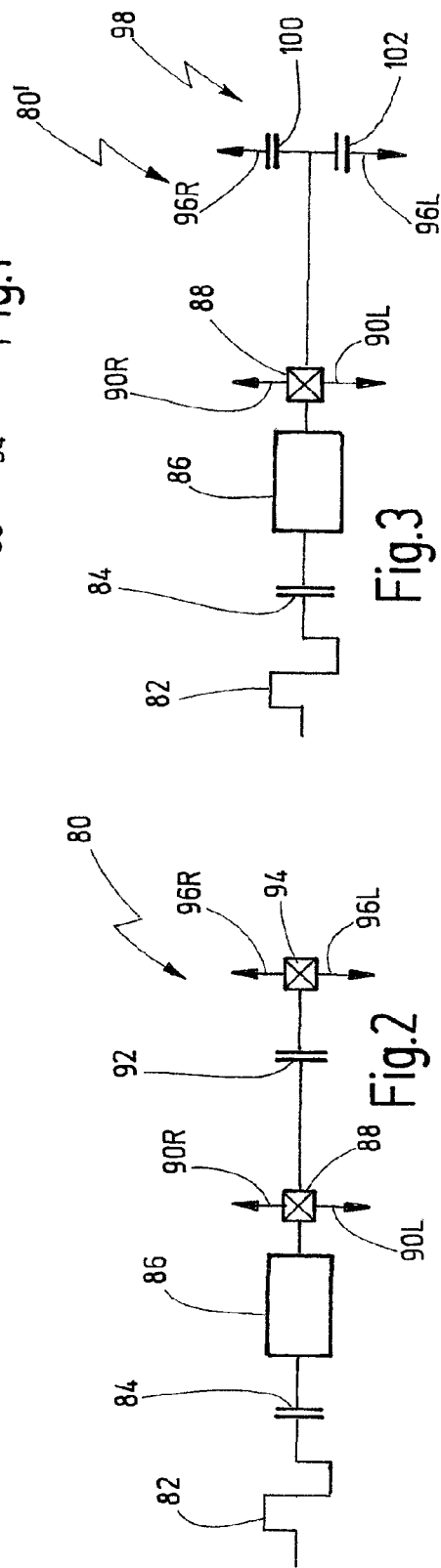

CLUTCH ARRANGEMENT FOR A VEHICLE DRIVE TRAIN

CROSS REFERENCE TO RELATED APPLICATIONS

The present application claims the priority of German patent application 10 2011 119 573 filed Nov. 23, 2011.

BACKGROUND OF THE INVENTION

The present invention relates to a clutch arrangement, in particular for a vehicle drive train, having a rotary element which is mounted on a housing so as to be rotatable about a longitudinal axis and which defines a cavity; a clutch which has a first clutch element and a second clutch element which can be coupled thereto, which clutch is arranged in the cavity, wherein the first clutch element or the second clutch element is coupled to the rotary element; and having a fluidic actuator arrangement which has a first and a second actuator element which can move relative to one another in order to activate the clutch.

Such clutch arrangements are used, for example, in vehicle drive trains as starter clutches which are arranged between an internal combustion engine and a speed-transforming gearbox. In addition such clutch arrangements are used as locking clutches. These may be, for example, what are referred to as "hang-on clutches" which, in order to set a four-wheel drive mode when necessary, connect a second driven axle to a cardan shaft or the like. However, such locking clutches can also be used as transverse locking clutches, wherein, for example, a right-hand and a left-hand drive shaft of a driven axle can be connected to one another in order in this way to set a transverse locking function. In addition, such locking clutches can be used in twin clutch arrangements which connect one output of a drive unit without a mechanical differential to a left-hand or right-hand drive shaft of a driven axle.

In such locking clutches, what are referred to as passive locking clutches are known in which a locking torque which cannot be influenced is set on the basis of a difference in rotational speed or difference in torque between the wheels or the axles. In this context, systems which sense the rotational speed include what are referred to as a visco clutch. In contrast, what are referred to as torsen differentials operate in a torque-sensing fashion.

In addition, what are referred to as active locks, which can be easily integrated into electronic drive control systems such as ABS (anti-skid) or ESP (traction control), are known. Active locks can be activated or deactivated at any time independently of differential rotational speeds, as a result of which interference torques associated with passive lock systems which could disrupt the electronic control systems are prevented. Friction clutches are generally used in the active locking clutches. Owing to the good meterability and the good wear behaviour, these friction clutches can be embodied as wet multi-plate clutches.

In the transverse locking clutches, rotational speed compensation can be limited owing to a mechanical differential of a driven axle. The advantage of such transverse locking clutches is that they can also be used in vehicles which are driven with just one axle, wherein properties can be obtained which are close to those of a sporty all-wheel drive. Such transverse locking clutches can, for example, be flange-connected to the outside of a gearbox housing as additional clutches and connected in a rotationally fixed fashion to a differential basket via a keyed joint toothing. However, it is also known to integrate such transverse locking clutches into the gearbox in order to save installation space, weight and assembly costs.

In order to activate such clutch arrangements it is known to provide, in a housing, a hydraulic pressure piston which, when pressure is applied, presses onto the clutch elements (for example multi-plate pack) via an arrangement composed of an axial bearing and a pressure plate. In these arrangements, the clutch arrangement does not form a system which is closed in itself, making handling complex in the case of integration and requiring changes to the gearbox housing. This in turn results in higher production costs.

In addition, concepts are known which are based on a rotating pressure piston. In this context, the hydraulic pressure is transferred from a housing, in which a pressure source is located, to the rotating locking clutch and the pressure piston integrated therein, via what is referred to as a rotary bushing. In this embodiment, no axial bearings are necessary. When such a co-rotating piston is used, the clutch arrangement can be embodied as an enclosed system which can be integrated into a gearbox using clearly defined existing interfaces. However, the required rotary bushing is technically very demanding and is generally associated with a relatively high leakage rate. This makes the use of a common pressure source difficult in the case of integration into an existing gearbox. In addition, the compensation of centrifugal forces which occur in the pressure piston is structurally complex and therefore expensive.

In order to activate such clutch arrangements it is also known to use ball ramp systems ("ETM"). In these ball ramp systems, an electric motor drives a ball ramp via a strong transmission ratio. As a result of the gradient in the raceway, an axial force is generated which compresses a multi-plate pack and as a result permits torque to be transmitted.

Although such ball ramp systems can be made very short in the axial direction, the relatively large electric motor has to be installed in the direct vicinity of the coupling system owing to the mechanical transmission of force.

In addition it is known to activate clutch arrangements via an electromagnetically actuated pilot control clutch. The pilot control clutch can decelerate a section of the ball ramp, as a result of which a relative rotational speed is brought about in the ball ramp. As a result, the ball ramp can apply force to the actual clutch pack and generate the locking effect and/or close the clutch.

However, such actuator arrangements with ball ramp and electromagnetically activated pilot control clutch are very large in the axial direction, which makes integration into drive trains difficult.

SUMMARY OF THE INVENTION

Against this background, an object of the invention is to make available a clutch arrangement which can be satisfactorily integrated into a vehicle drive train and/or which can be embodied as a closed system or module.

This object is achieved with the clutch arrangement specified at the beginning in that at least the first actuator element can be secured in a rotationally fixed fashion to the housing and extends from outside the rotary element into the cavity.

This measure makes it possible to ensure that the friction clutch can be formed as an enclosed module, with the result that it can be integrated better into vehicle drive trains.

According to one particularly preferred embodiment, the first actuator element is supported on the rotary element by means of a first axial bearing inside the cavity.

In this embodiment, at least the first actuator element can preferably be secured in an axially displaceable fashion with respect to the housing.

The first actuator element here preferably has a longitudinal section which extends from the housing into the cavity, and a radial section by means of which the first actuator element can be supported on the rotary element by means of the first axial bearing inside the cavity.

It is also particularly preferred if the second actuator element can be secured in a rotationally fixed fashion to the housing and extends from outside the rotary element into the cavity.

As a result, the actuator system can be arranged in a structurally simple way in the cavity, with the result that an enclosed module is produced for the clutch arrangement.

The second actuator element is preferably also mounted in an axially displaceable fashion with respect to the housing (for example via a key toothing or the like).

In addition it is preferred if the second actuator element acts on the friction clutch by means of a second axial bearing.

The second actuator element also preferably has a longitudinal section which extends from the housing into the cavity, and a radial section which acts on the friction clutch by means of the second axial bearing.

As a result of this measure, axial forces can be applied to the clutch inside the cavity.

According to a further overall preferred embodiment, which in conjunction with the clutch arrangement mentioned at the beginning constitutes a separate invention, a pressure space, which can be connected via a fluid duct to a fluid supply device which is fixed to the housing, is formed between the first and the second actuator element inside the cavity, wherein the fluid duct is formed in one of the actuator elements and/or between the first actuator element and the second actuator element.

As a result, the fluid from the fluid supply device (which, for example, has pressure control devices etc.) which is fixed to the housing can be conducted into the pressure space. In addition, the actuator arrangement can be implemented without a rotary bushing. The fluid can be fed into the interior of the cavity via the housing, wherein the first and/or the second actuator element can easily be sealed with respect to the housing by means of annular seals such as O-ring seals or the like.

In order to seal the pressure space inside the cavity between the first and the second actuator element, a seal is preferably provided which can also be easily embodied as an O-ring seal or the like. For this purpose it may also be advantageous if one of the actuator elements has, at the free end of the radial section, a further longitudinal section which engages over the radial section of the other actuator element, wherein the seal can be provided in this region.

In addition, it is advantageous overall if the cavity can be sealed with respect to the surroundings and/or with respect to the fluidic actuator arrangement. In this embodiment, the rotary element which forms the cavity can form the "outer skin" of the closed clutch arrangement module inside which a pressure space of the actuator arrangement is formed.

Since the cavity can also be sealed with respect to the fluidic actuator arrangement, it is also possible to activate a dry friction clutch by means of the fluidic actuator arrangement, wherein the clutch is, however, preferably embodied as a wet-running multi-plate clutch.

It is generally possible for the first or the second clutch element to be rigidly coupled to the rotary element.

It is particularly preferred if the first clutch element is coupled to the rotary element via a gear set arrangement.

In this embodiment, the gear set arrangement can set up a transmission ratio between the rotary element and the first clutch element. In addition, it is possible to embody the gear set arrangement as a mechanical differential such that the clutch arrangement can be embodied as a transverse lock or longitudinal lock of a torque-distributing differential of a drive train.

Accordingly, the above object is also achieved by a lockable differential having a housing and having a clutch arrangement of the type according to the invention, wherein the first clutch element is coupled to the rotary element via a gear set arrangement, wherein the gear set arrangement is a planetary gear set arrangement with a first gear set element, a second gear set element and with a third gear set element, wherein the first gear set element is connected to the rotary element which forms an input of the differential, wherein the second and the third gear set element form outputs of the differential, and wherein the first clutch element is connected to the second gear set element, and wherein the second clutch element is connected to the third gear set element.

A lockable differential of this type can be easily provided in the installation space, which is provided in any case for a differential in, for example, front/transverse transmissions. The drive of the lockable differential can be provided by virtue of the fact that the rotary element, which forms a type of differential basket in the present case, is connected to a gear wheel which can be connected to the output of a drive unit (for example internal combustion engine and speed-transforming gearbox).

In the case of the lockable differential it is generally possible for the clutch arrangement to be embodied according to the dog clutch type.

However, it is particularly preferred if the clutch is a friction clutch, in particular a wet-running multi-plate clutch.

In this case, it is also advantageous if the second transmission element or the second gear set element forms an additional friction pairing with the rotary element.

As a result, the contact face which is necessary to support the clutch arrangement on the axial side lying opposite the pressure space can be used to form an additional friction pairing, with the result that the friction coupling itself can be made smaller and/or the required activation pressure can be reduced and/or a further axial bearing can be eliminated.

Overall, it is preferred according to the invention if the clutch arrangement of the type according to the invention can be used as a hang-on clutch for an all-wheel drive train or as a clutch of a double clutch arrangement of a double clutch transmission or as a clutch of a twin clutch arrangement for distributing drive torque to driven wheels of a driven axle of a motor vehicle.

In addition, overall it is possible to implement at least one of the following advantages by the invention depending on the embodiment.

On the one hand, a stationary hydraulically actuable pressure piston structure can be made available in a rotating clutch arrangement which is preferably embodied as a locking clutch arrangement.

This results in a closed module which can be integrated into a vehicle gearbox by using existing interfaces without an appreciable amount of expenditure on modification. The pressure transfer to the pressure piston takes place during operation in a static state, which keeps the structure simple and cost-effective. There is no need for compensation of centrifugal force. The pressure transfer may be integrated, for example, into the seat of a radial shaft sealing ring on a differential housing, in particular pressed in. In this embodiment, the modifications to the gearbox can be minimized.

In the case of integration into a double clutch gearbox, the existing pressure source of the gearbox can be used, with the result that only an additional open-loop or closed-loop pressure control valve and, if appropriate, a control unit, are necessary.

An enclosed clutch arrangement system which has a leakage rate as in a system with a stationary piston is made possible. The clutch arrangement structure is simple, which provides advantages in terms of the development and production costs. The static seals in the region of the pressure transfer do not have any wear over the service life, in contrast with a rotary bushing.

In addition, the static pressure transfer can be provided in the housing of the gearbox, as a result of which at least one component is eliminated.

Furthermore, a compact design can be implemented.

Of course, the features mentioned above and the features which are still to be explained below can be used not only in the respectively specified combination, but also in other combinations or alone without departing from the scope of the present invention.

BRIEF DESCRIPTION OF THE DRAWINGS

Exemplary embodiments of the invention are illustrated in the drawing and will be explained in more detail in the following description. In the drawing:

FIG. 1 shows a schematic longitudinal sectional view through a clutch arrangement according to an embodiment of the present invention;

FIG. 2 shows a drive train of a motor vehicle having a starter clutch and a hang-on clutch;

FIG. 3 shows a drive train of a motor vehicle having a starter clutch and two clutches of a twin clutch arrangement;

DETAILED DESCRIPTION OF THE INVENTION

Figure 4:
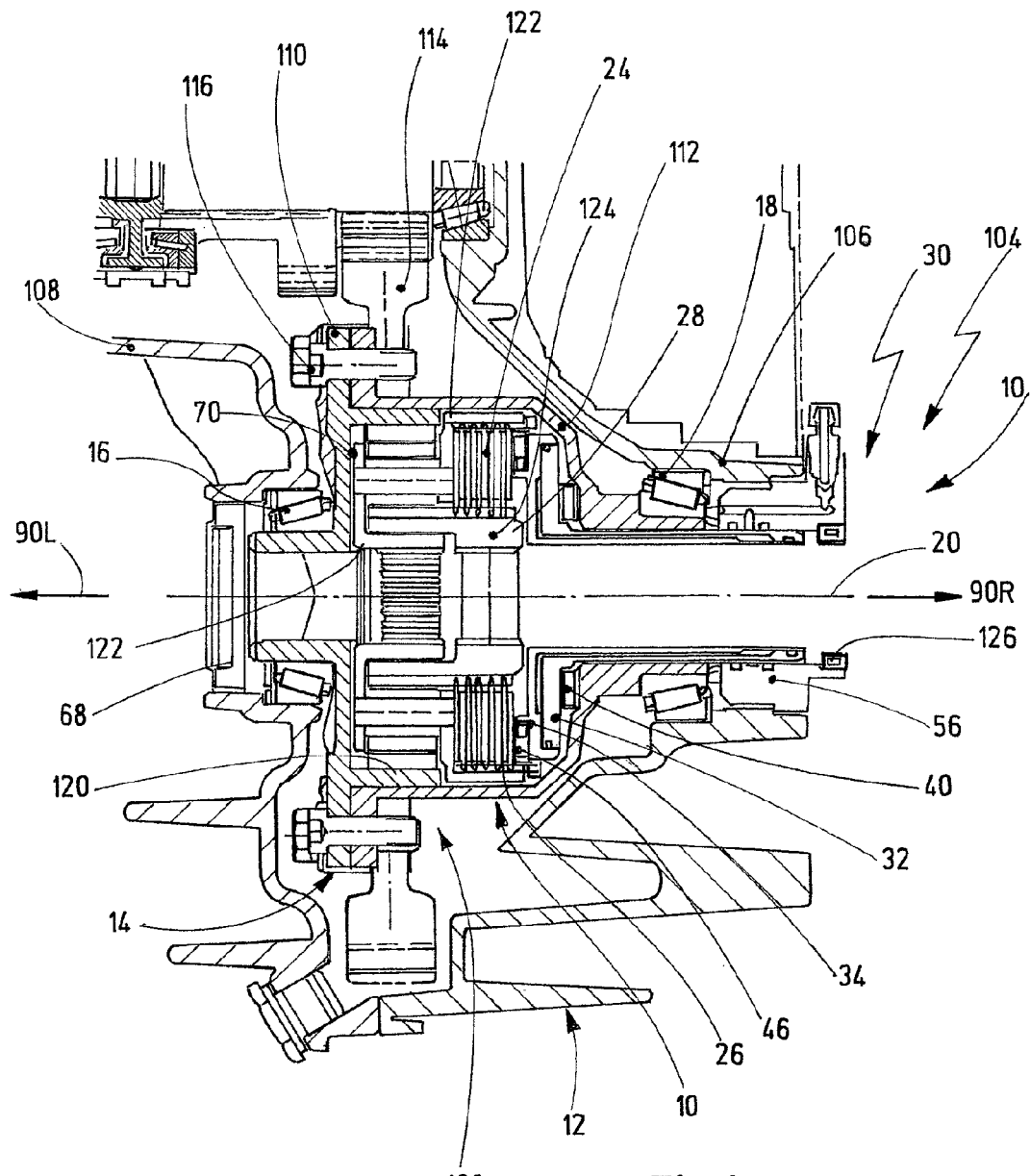
FIG. 4 shows a longitudinal sectional view through an embodiment of a lockable differential.

In FIG. 1, a first embodiment of a clutch arrangement according to the invention is illustrated schematically in longitudinal section and denoted generally by 10.

The clutch arrangement 10 has a housing 12 which may be, for example, part of a housing of a vehicle gearbox, but which can also be embodied as a separate housing.

In addition, the clutch arrangement 10 contains a rotary element 14, which is rotatably mounted on the housing 12 by means of a first radial bearing 16 and by means of a second radial bearing 18. Alternatively, a support on a shaft arrangement is also conceivable. The rotary element 14 is mounted so as to be rotatable about a longitudinal axis 20 here and is embodied in the manner of a basket, with the result that a preferably rotationally symmetrical cavity 22 is defined by the rotary element 14.

A clutch 24, which is preferably embodied as a wet-running multi-plate clutch and has a first clutch element 26 and a second clutch element 28, is formed inside the cavity 22. In the present case, the first clutch element 26 is connected in a rotationally fixed fashion to the rotary element 14. As illustrated, the rotary element 14 here may form an outer plate carrier on which plates of the first clutch element 26 are mounted in a rotationally fixed fashion.

The second clutch element 28 may be connected, for example, to an output shaft, on which more details are given below.

The clutch arrangement 10 also contains an actuator arrangement 30 in the form of a fluidic actuator arrangement. The actuator arrangement 30 contains a first actuator element 32 and a second actuator element 34. The first actuator element 32 has a first longitudinal section 36 which extends in the axial direction from a section of the housing 12 into the cavity 22. In addition, the first actuator element 32 has a first radial section which is connected to the first longitudinal section 36 and extends radially outward inside the cavity 22. The first radial section 38 here is adjacent to a radial section of the rotary element 14. A first axial bearing 40, by means of which the first actuator element 32 is supported axially on the rotary element 14, is arranged between the first radial section 38 and the rotary element 14. The first longitudinal section 36 of the first actuator element 32 can be secured in a rotationally fixed fashion to the housing 12, but is preferably mounted in a displaceable fashion, in particular so as to be displaceable to a limited degree, on the housing 12.

The second actuator element 34 has a second longitudinal section 42 and a second radial section 44. The second longitudinal section 42 is arranged concentrically with respect to the first longitudinal section 36, wherein the first longitudinal section 36 can be provided as a hollow shaft section around the second longitudinal section 42.

The second longitudinal section 42 is also connected in a rotationally fixed fashion to the housing 12, but can preferably be mounted in an axially displaceable fashion thereon. The second longitudinal section 42 also extends into the cavity 22 in such a way that the second radial section 44 is arranged in the axial direction between the first radial section 38 and the clutch 24. A second axial bearing 46, by means of which the clutch 24 can be actuated, is arranged between the second radial section 44 and the clutch 24.

A fluid duct 48, which is fluidically connected to a pressure space 50 which is formed between the first radial section 38 and the second radial section 44 is formed between the first longitudinal section 36 and the second longitudinal section 42. A third longitudinal section 54, which extends over the first radial section 38, is formed at the radially outer end of the second radial section 44. A first seal 52, which seals the pressure space 50, is arranged between the third longitudinal section 54 and the first radial section 38.

The housing 12 has a sealing block 56, wherein a second seal is provided between the sealing block 56 and the first longitudinal section 36. Finally, a third seal 60 is provided between the sealing block 56 and the second longitudinal section 42. The seals 52, 58, 60 can each be embodied as static seals, for example in the form of annular seals such as 0-ring seals.

A fluid bore 62 is formed in the sealing block 56 and opens into the fluid duct 48 between the second seal 58 and the third seal 60 and is connected to a schematically indicated fluid supply device 64. The fluid supply device 64 may make available a fluid with a preferably regulated pressure.

The first longitudinal section 36 is illustrated here as a solid shaft section but may also be embodied as a hollow shaft section.

The second clutch element 28 forms an internal multi-plate carrier, which is connected to an output shaft 66 of the clutch arrangement 10 via a web section (not denoted here in more detail) or the like. The output shaft 66 extends out of the cavity 22 on the side of the rotary element 14 which lies axially opposite the actuator arrangement 30. The output shaft 66 can be sealed with respect to the housing 12 by means of a shaft seal 68.

The method of functioning of the clutch arrangement 10 is as follows. The clutch 24 is preferably a normally open friction clutch which is configured to connect the rotary element 14 to the output shaft 66 or to disconnect it therefrom. The rotary element 14 can be driven by means of a drive arrangement (not denoted in more detail). In the opened state of the clutch 24, this rotary movement is substantially not transmitted to the output shaft 66. If the clutch 24 is closed, the output shaft 66 rotates along with the rotary element 14. The input and output functions of the rotary element 14 and output shaft 66 can also be interchanged.

In order to close the clutch 24, a fluid under pressure is made available by the fluid supply device 64, which fluid passes into the pressure space 50 via the fluid bore 62 and the fluid duct 48. The first actuator element 32 and the second actuator element 34 are pressed away from one another in the longitudinal direction by the pressure which builds up in the pressure space 50. The first actuator element 32 is supported here by means of the first axial bearing 40 on the rotary element 14 whose axial position is preferably secured by means of an axial bearing, which is not denoted in more detail (this axial bearing function can also be made available by the first or the second radial bearing 16, 18).

As a result of the pressure in the pressure space 50, the second actuator element 34 is moved towards the clutch 24, with the result that the plates of the first and of the second clutch element 26, 28 are pressed together. The pressing is carried out here by means of the second axial bearing 46 (and, if appropriate, a further pressing element).

In this context, contact which is set, if appropriate, between the clutch 24 and a radial wall of the rotary element 14 can be used to set up an additional friction pairing 70. In other words, the plate pack can be pressed in the axial direction against the inner wall of the rotary element 14, wherein frictional engagement is set which assists the closing function of the clutch 24.

In order to open the clutch 24, the pressure in the pressure space 50 is reduced again, with the result that the clutch 24 can open. The clutch 24 may have, for this purpose, a spring element or the like, if appropriate.

The fluid can be fed in as illustrated via a fluid duct 48 between the first longitudinal section 36 and the second longitudinal section 42. Alternatively, the fluid duct 48 can also be formed in the first longitudinal section 36 or in the second longitudinal section 42. In addition, a further duct, via which the multi-plate clutch is supplied with fluid or via which fluid is discharged from the cavity 22, can be formed in one of the longitudinal sections 36, 42.

A clutch arrangement 10 of the type described in FIG. 1 can be used, for example, in vehicle drive trains. An example of such a drive train is illustrated schematically in FIG. 2 and denoted by 80.

The drive train 80 has a drive motor in the form of an internal combustion engine 82 and a starter clutch 84 which connects an output of the drive motor 82 to a speed-transforming gearbox 86. An output of the speed-transforming gearbox 86 is connected to a first differential 88 which distributes drive power to two driven wheels 90L, 90R of a first driven axle of the motor vehicle. In the drive train 80, the output of the speed-transforming gearbox 86 is also connected via a hang-on clutch 92 to a second differential 94 which is configured to distribute drive power to driven wheels 96L, 96R of a second driven axle.

The clutch arrangement 10 in FIG. 1 can be used, for example, as a starter clutch 84 and/or as a hang-on clutch 92.

FIG. 3 shows a further embodiment of a drive train 80', which generally corresponds to the drive train 80 in FIG. 2 in terms of design and method of functioning. Identical elements are therefore characterized by identical reference symbols. The differences are substantially explained below.

In the drive train 80' in FIG. 3, a twin clutch arrangement 98 is provided instead of the second differential 94, which twin clutch arrangement 98 has a first side clutch 100 and a second side clutch 102, the outputs of which are connected to the driven wheels 96L, 96R. The clutch arrangement 10 in FIG. 1 can also be used for any of the two side clutches 100, 102.

FIG. 4 illustrates a lockable differential with a further embodiment of a clutch arrangement 10 which corresponds to the clutch arrangement 10 in FIG. 1 in terms of design and method of functioning. Identical elements are therefore characterized by identical reference symbols. The differences are substantially explained below.

The lockable differential is denoted generally by 104 in FIG. 4. The lockable differential 104 is configured for example for connection to a front transverse drive unit of a motor vehicle and is arranged coaxially with respect to a longitudinal axis 20 which constitutes a driven axle for driven wheels 90L, 90R. The lockable differential 104 is rotatably mounted on a main housing 108 of the gearbox by means of the first radial bearing 16, and on a clutch housing 106 by means of the second radial bearing 18. The lockable differential 104 has a first differential basket part 110 and a second differential basket part 112, which together form a rotary element 14 which defines a cavity (not denoted in more detail in FIG. 4). The differential basket parts 110, 112 are rigidly connected to one another and to a plate wheel 114, specifically by means of a screwed connection arrangement 116. The plate wheel 114 is in engagement with an output gear or with output gears of the gearbox.

The clutch 24, which is coupled to the second actuator element 34 via the second axial bearing 46, is arranged in the cavity 22 of the rotary element 14. A planetary gear set 108 is accommodated inside the cavity 22, on the side of the clutch 24 facing away from the actuator arrangement 30. The planetary gear set 118 has a ring gear 120 which is connected in a rotationally fixed fashion to the rotary element 14. In addition, the planetary gear set 118 contains a planetary carrier 122 on which a multiplicity of planets are rotatably mounted. The planetary carrier is connected to the first clutch element 26 which is not connected to the rotary element 14 in the present embodiment.

In addition, the planetary gear set 122 has a sun gear in the form of a hollow sun shaft 124 which is connected to the second clutch element 28. The hollow sun gear shaft 124 has an inner toothing via which a drive shaft for one driven wheel 90R can be connected in a rotationally fixed fashion to the sun gear shaft 124. In addition, the planetary carrier 122 has a shaft section which has a corresponding inner toothing for connecting a drive shaft for the other driven wheel 90L. The planetary gear set 122 can also be embodied as a double planetary differential.

FIG. 4 is a schematic illustration of the shaft sealing ring 68 for sealing the drive shaft for the driven wheel 90L. In addition, FIG. 4 illustrates a shaft seal 126 for sealing the housing 12 with respect to the drive shaft for the driven wheel 90R.

If the clutch 24 is opened, the planetary gear set 118 acts as an open differential in which the drive power is distributed to the driven wheels 90L, 90R in the manner of a torque balance, as is known in the prior art. If the clutch 24 is closed entirely or partially, a greater or lesser locking effect begins which causes the sun gear 124 and the planetary carrier 122 to be rigidly connected to one another. As a result, a locking effect is generated since identical portions of the drive power are transmitted to the driven wheel, and the same drive torque is apportioned to the driven wheels 90L, 90R. As a result of the shaft-shaft arrangement of the planetary gear set, the locking torque is equal to twice the clutch torque.

Since the actuator arrangement is integrated into the rotary element 14, the lockable differential 104 is embodied as a closed module which can be easily connected, on the one hand, to the output of the gearbox. On the other hand, the pressure space 50 can be implemented without a rotary bushing and without equalization spaces. In addition, there is a simple connection to already existing housing structures.

Figure 5:
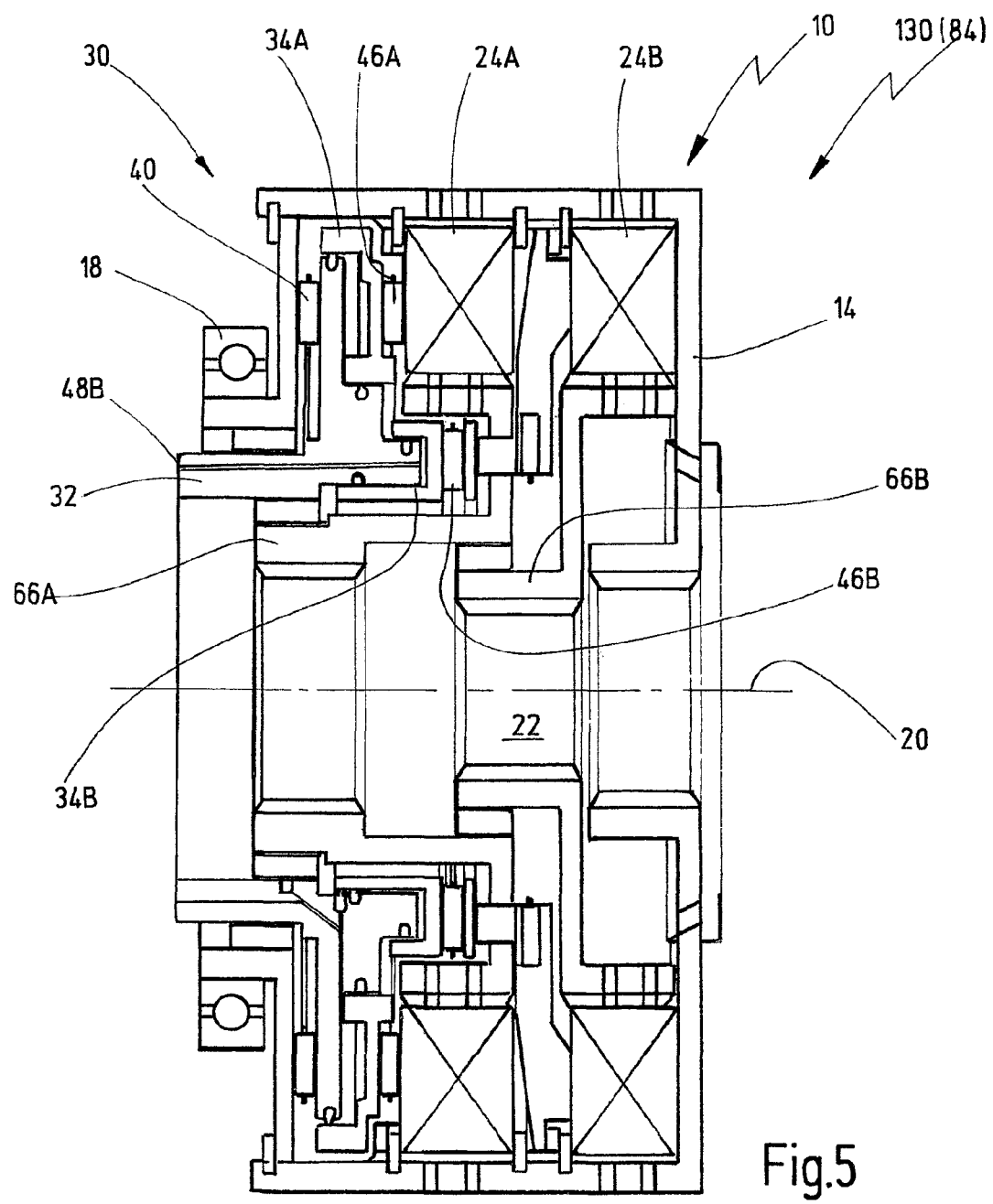
FIG. 5 shows a schematic longitudinal sectional view through a double clutch arrangement with two clutch arrangements according to the invention.

FIG. 5 illustrates in schematic form a double clutch arrangement 130 which can be arranged as a starter clutch arrangement between an internal combustion engine and a range-change gearbox. The double clutch arrangement 130 generally corresponds to the clutch arrangement 10 in FIG. 1 in terms of design and method of functioning. Identical elements are therefore characterized by identical reference symbols. The differences are substantially explained below.

The rotary element 14 has a receptacle for a crankshaft and consequently forms a drive element of the double clutch arrangement 130. The actuator arrangement 30, which has a first actuator element 32 which is connected in a rotationally fixed fashion to a housing (not illustrated) and extends into the cavity 22, is formed on the axially opposite side. The first actuator element 32 here has a radial section on which a second actuator element 34A for a first clutch 24A of the double clutch arrangement 130 is mounted in an axially displaceable fashion by means of two seals (not denoted in more detail). In addition, a further second actuator element 34B for a second clutch 24B is mounted in an axially displaceable fashion radially further towards the inside on the first actuator element 32, and is sealed by means of two seals (not denoted in more detail). The second actuator elements 34A, 34B act on the clutches 24A and 24B via respective axial bearings 46A, 46B, wherein a pressing element is arranged between the second axial bearing 46B and the second clutch 24B.

The two clutches 24A, 24B are each connected on their outer circumference to the rotary element 14 in a rotationally fixed fashion. On their inner circumference, the two clutches 24A, 24B are each connected to an output shaft 66A, 66B, wherein the output shaft 66A is designed for connection to a hollow shaft of a double clutch gearbox which is arranged downstream, and wherein the output shaft 66B is designed for connection to an inner shaft of the double clutch gearbox which is arranged downstream.

What is claimed is:

1. Clutch arrangement having
a rotary element which is mounted on a housing so as to be rotatable about a longitudinal axis and which defines a cavity;
a clutch which has a first clutch element and a second clutch element which can be coupled thereto, which clutch is arranged in the cavity, wherein the first clutch element or the second clutch element is coupled to the rotary element; and
a fluidic actuator arrangement which has a first and a second actuator element which can move relative to one another in order to activate the clutch;
wherein the first and second actuator elements are secured in a rotationally fixed fashion to the housing and extend from outside the rotary element into the cavity, wherein the second actuator element acts on the clutch by means of a second actuator element axial bearing inside the cavity.

2. Clutch arrangement according to claim 1, wherein the first actuator element is supported on the rotary element by means of a first actuator element axial bearing inside the cavity.

3. Clutch arrangement according to claim 1, wherein a pressure space, which can be connected via a fluid duct to a fluid supply device which is fixed to the housing, is formed between the first and the second actuator element inside the cavity, wherein the fluid duct is formed in one of the actuator elements.

4. Clutch arrangement according to claim 1, wherein a pressure space, which can be connected via a fluid duct to a fluid supply device which is fixed to the housing, is formed between the first and the second actuator elements inside the cavity, wherein the fluid duct is formed between the first actuator element and the second actuator element.

5. Clutch arrangement according to claim 1, wherein the cavity can be sealed with respect to at least one of the surroundings and the fluidic actuator arrangement.

6. Clutch arrangement according to claim 1, wherein the first clutch element is coupled to the rotary element via a gear set arrangement.

7. Clutch arrangement having
a rotary element which is mounted on a housing so as to be rotatable about a longitudinal axis and which defines a cavity;
a clutch which has a first clutch element and a second clutch element which can be coupled thereto, which clutch is arranged in the cavity, wherein the first clutch element or the second clutch element is coupled to the rotary element; and
a fluidic actuator arrangement which has a first and a second actuator element which can move relative to one another in order to activate the clutch;
wherein a pressure space, which can be connected via a fluid duct to a fluid supply device which is fixed to the housing, is formed between the first and the second actuator elements inside the cavity, wherein the fluid duct is formed between the first actuator element and the second actuator element, wherein the second actuator element acts on the clutch by means of a second actuator element axial bearing inside the cavity.

8. Clutch arrangement according to claim 7, wherein the cavity can be sealed with respect to at least one of the surroundings and the fluidic actuator arrangement.

9. Clutch arrangement according to claim 7, wherein the first clutch element is coupled to the rotary element via a gear set arrangement.

* * * * *